United States Patent
Schneider

(10) Patent No.: US 8,549,613 B2
(45) Date of Patent: Oct. 1, 2013

(54) REVERSE VPN OVER SSH

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 924 days.

(21) Appl. No.: 12/156,061

(22) Filed: May 28, 2008

(65) Prior Publication Data

US 2009/0300721 A1    Dec. 3, 2009

(51) Int. Cl.
*H04L 29/00*    (2006.01)

(52) U.S. Cl.
USPC ...... 726/14; 726/2; 726/3; 713/155; 713/156; 713/157; 713/158; 713/159

(58) Field of Classification Search
USPC .......................................................... 726/14
See application file for complete search history.

(56) References Cited

U.S. PATENT DOCUMENTS

| | | | |
|---|---|---|---|
| 6,745,229 B1 * | 6/2004 | Gobin et al. | 709/206 |
| 2005/0091540 A1 * | 4/2005 | Dick et al. | 713/201 |
| 2005/0228874 A1 * | 10/2005 | Edgett et al. | 709/220 |
| 2005/0273849 A1 * | 12/2005 | Araujo et al. | 726/12 |

OTHER PUBLICATIONS

Rekhter, Y., et al., "Address Allocation for Private Internets," Network Working Group, Request for Comments: 1918, Category: Best Current Practice, 9 pages, Feb. 1996.

* cited by examiner

*Primary Examiner* — Ghazal Shehni
(74) *Attorney, Agent, or Firm* — Lowenstein Sandler LLP

(57) ABSTRACT

A system and method for enabling access to a computer server operating within a private network, in which the computer server is isolated by access restrictions that prevent incoming connections from a public network. In one embodiment, the method includes identifying a remote client operating in a public network outside the private network, initiating a secure communication channel with the remote client, and instructing the remote client to initiate a Point-to-Point Protocol (PPP) session with the computer server via the secure communication channel.

21 Claims, 5 Drawing Sheets

REVERSE VPN OVER SSH

TECHNICAL FIELD

Embodiments of the invention relate to the field of computer networking, and more particularly, to enabling access to a computer server operating on a protected network by a remote client operating on a public network.

BACKGROUND

Computer servers such as web servers provide access to information and services for computer clients separately located from the computer server. Many computer servers operate on a publicly accessible network, such as the Internet. Such servers can send and receive requests from other machines, clients or servers, operating on the same public network. For example, most commercial businesses operate a website that customers may use to locate information about the business or to contact the business. It is thus desirable for such websites to be accessible to the public. Accordingly, the computer server hosting the business website must be addressable via the public network.

Other computer servers, however, provide access to services and information that are not intended for public consumption. Thus, it is not desirable for such computer servers to operate on a public network. For example, many companies operate "internal" computer networks, or "intranets," on which many client and server machines communicate and interact, outside of the public view. Information and services provided by internal computer servers may include confidential information pertaining to the operations of the company, intended for use by company employees, but not intended to be accessible to the general public.

Computer servers operating on the Internet are said to have a "routable" address, meaning that another computing device on the public network can send information to the server over the Internet, and that information can be successfully routed to the computer server. This routing is performed primarily on the basis of an Internet Protocol (IP) address that is uniquely assigned to the computer server. Conversely, computer servers operating within an internal or "private" network are said to have "non-routable" addresses, meaning a computing device operating on the Internet cannot successfully send information to the computer server on the basis of the non-routable address alone. A computer server operating within a private network may not possess a globally unique IP address by which information may be routed.

Generally, communications between two computing devices operating on the Internet flow freely, as do communications between two computing devices operating within the same private or internal network. However, obstacles and restrictions arise when a computing device operating on the public Internet attempts to initiate communications with a computing device operating within a private network, as the computing device operating within the private network may not have a public IP address with which information may be routed to it.

These problems are exacerbated in situations where a private network is protected by network security mechanisms, such as firewalls, proxy-servers, and routing policies that reject or drop incoming traffic to a private network. Such mechanisms protect the network from unauthorized access, for example, a competitor attempting to access sensitive business data, or a computer hacker attempting to steal or damage information stored on the network. Unfortunately, the same security mechanisms designed to keep out unauthorized persons just as effectively keep out those persons having a legitimate and authorized purpose for accessing information and services available on computer servers within the private network (e.g., a company employee working from home or a traveling sales person attempting to access a company email account outside of the private network).

Some potential solutions do exist; however, they require administrative privileges and access to the hardware and software that controls access to the private network. Generally speaking, individuals, such as employees of a company or students on a school campus, do not have administrative level permissions and access to a private network, and thus it is not feasible for such individuals to implement existing solutions.

Potential solutions that require administrative access to network hardware include "boundary" or "edge" servers that provide an interface between the private network and a public network. Boundary servers may allow access to internal private networks from computing devices operating within external networks, if those computing devices can traverse a variety of access restrictions. However, as stated above, implementation of such boundary servers require administrative access to the private network and thus are not practical for many users. Even where boundary servers do exist within a private network, they are not always available due to reliability problems or security concerns. For example, a boundary server may be intentionally configured to drop client connections periodically, be taken offline or out of service temporarily for maintenance purposes, or suffer from hardware or software crashes, thus preventing access. When these problems occur, a user is helpless to solve the problem and must instead wait for resolution by the network administrators responsible for the private network.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
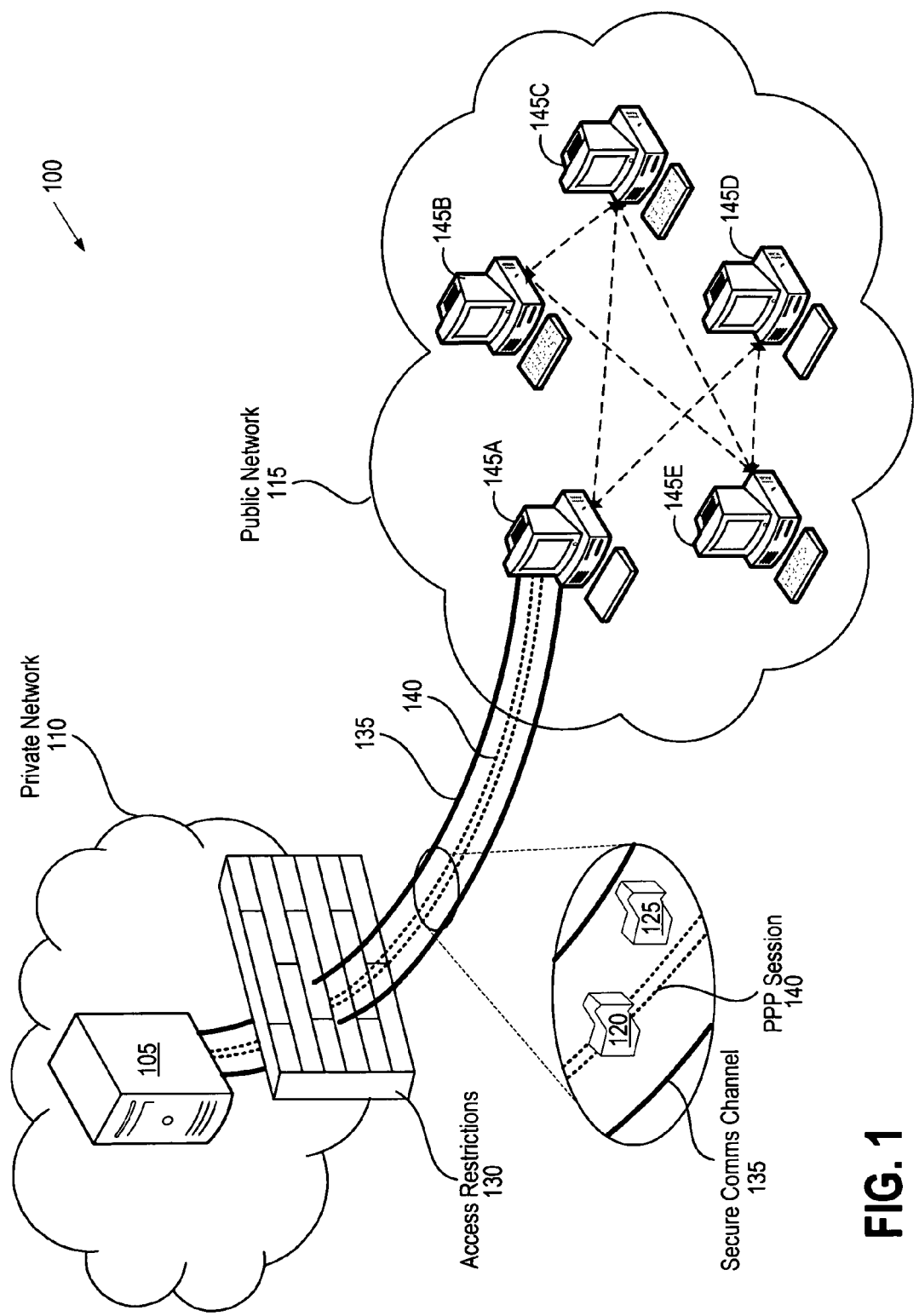
FIG. 1 illustrates an exemplary network architecture in which embodiments of the present invention may operate.

Described herein are a system and method for enabling access to a server operating within a private network by a remote client operating on a public network. In one embodiment, the server initiates a secure communication channel with the remote client, and instructs the remote client to initiate a point-to-point protocol session with the server over the secure communication channel. A secure communication channel as referred to herein is a network communication pathway between two computing devices that traverses network access restrictions in place between the two computing devices and allows for secure peer to peer communication between the two computing devices. Next, the server instructs the remote client to request a Point-to-Point Protocol (PPP) session with the server via the secure communication channel. Upon receiving a PPP session request from the remote client via the secure communication channel, the server grants the PPP session request, thus establishing a PPP session from the remote client to the server over the secure communication channel.

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Embodiments of a mechanism for enabling access to a computer server on a protected network by a remote client on a public network will now be discussed in more detail.

An exemplary computer server operating within a private network may be an employee workstation operating within a private network operated by an Enterprise, such as a corporation's "intranet," or internal network. The employee workstation may run a variety of applications or provide access to information to an employee of the Enterprise. For example, through the computer server, e.g., the employee workstation, an employee may be able to access computer files, Enterprise email, Enterprise printers, calendars, collaboration tools, etc. The computer server may further provide access to the internal network of the Enterprise, or to remote desktop software that enables an employee to manipulate a desktop environment executing at the computer server from a remote machine, such as a remote client operating within the public network (e.g., a home computer connected to the public Internet).

Remote access to information, services, applications, and utilities available at the computer server operating within the private network of the Enterprise may allow an Enterprise employee to perform work related tasks from a computing device located outside of the private network. For example, an Enterprise employee may be enabled to "work from home," if the employee had access to the necessary tools and information traditionally available from the Employee's workstation operating within the private network.

Enabling a computing device operating on a public network to communicably interface with a computer server operating within a private network is commonly referred to as "Virtual Private Networking." A Virtual Private Network (VPN) is a computer network in which at least a portion of the network links between two network nodes (e.g., the computer server and the computing device) are carried on "open" network links, that are not physically secured or controlled by the Enterprise. Various types of VPNs exist, and may be created in a variety of ways. A VPN connection refers to the creation of a "virtual" smaller network that isolates network traffic between the nodes operating on the VPN from network traffic of nodes operating within a larger general network, such as the public network. Computer nodes communicating within a VPN benefit from apparent transparency of the underlying VPN mechanism, making networking tasks much simpler, even if the underlying transport mechanism and protocols used to create the VPN are complex. For example, a computing device operating within a public network that connects with a computer server operating within a private network may appear to a user as though the computing device is directly connected with the private network and able to access resources of the private network, when in reality, a series communication links over the public network leading to the private network and through complex access restrictions of the private network are likely employed.

Various technological disciplines are involved in the creation of VPNs, such as network tunneling, encryption, authentication, routing, performance tuning, and so forth. These technologies are generally well understood in the art and will be discussed in detail only to the extent they are pertinent to embodiments of the present invention.

FIG. 1 illustrates an exemplary network architecture 100 in which embodiments of the present invention may operate. The architecture 100 may include computer server 105 operating within private network 110, each of which may be isolated from public network 115 via access restrictions 130. As stated above, computer server 105 may be an employee workstation within an Enterprise that provides access to information, utilities, and applications that are available to employees of the Enterprise via the employee workstation. Computer server 105 may be any computing device that provides access to information or services to a remote computer. Multiple computer servers 105 may operate within private network 110, however, only one is shown for the sake of clarity.

Private network 110 may be an "intranet" maintained and controlled by an Enterprise or other entities, such as a corporation, a government entity, an academic university, a charitable organization, and so forth. Private networks, also referred to as "internal networks" and "intranets," are generally created and maintained with private networking equipment that is dedicated to the private network, rather than employed for the benefit of a larger publicly accessible network 115. Some private networks 110, however, are actually VPNs themselves that operate on networking equipment maintained by an Internet Service Provider (ISP) that maintains the hardware and may use the same hardware to support a variety of entities, each isolated from each other via VPN technologies, with each entity appearing to operate within its own physically controlled private network. A mix of private and leased or public networking equipment is also feasible. The presence of a larger VPN in which an entity operates has no affect on the embodiments discussed herein beyond serving as one type of an access restriction that may be overcome by the system and methods taught herein.

Private network 110 may be limited to a very small number of computing devices, such as a small business with perhaps a dozen or fewer computers, or a private network may be vast, encompassing thousands of computers. For example, entities such as a large corporation, a military installation, or a university campus may have a private network 110 linking many of the computers associated with the entity together so that computers within the private network 110 can communicate securely and privately with each other. Private networks 110 typically provide for improved performance due to lesser competition for resources compared with that of public networks 115, and may also provide for enhanced services, such as access to confidential or private information that is accessible within the private network 110, but not freely accessible to computing devices outside the private network 110.

Private network 110 and the computing devices, including computer server 105 operating within the private network are protected by access restrictions 130. Access restrictions 130 are wide ranging, with some pertaining to security and authentication technologies, others pertaining to design limitations of the private network 110. Generally speaking, an access restriction 130 is any mechanism that isolates the private network 110 from public networks 115 (such as the Internet) in some way. Access restrictions 130 may wholly prevent access to the private network 110 from public networks 115, or may simply prevent unauthorized access to the private network 110. Some access restrictions 130 may limit certain types of network traffic from entering or leaving the private network 110, while other access restrictions 130 may prevent incoming connection attempts (e.g., unsolicited network connections or network traffic), but allow outgoing network traffic and connections from the private network 110 to destinations on the public network 115. Some access restrictions 130 may allow incoming network traffic and connection attempts from a public network 115 when the incoming traffic is responsive to corresponding outgoing network traffic from the private network 105, but not when the incoming traffic is unsolicited.

As discussed above, one common access restriction 130 is the non-addressability of computing devices operating within the private network 110, which are said to be "non-routable" or "non-addressable," as information cannot be routed to such computing devices-via the public network 115, without special accommodations. For example, RFC 1918 defines certain IP address ranges (e.g., address spaces) that are non-routable via the Internet. Border routers operating on the Internet in compliance with RFC 1918 are prohibited from propagating routing information about such computing devices, and thus, will not pass network traffic to or from a non-routable IP address without special accommodations. Special accommodations may include network traffic encapsulation in which an IP packet is "encapsulated" as a "payload" within a second IP packet acting as a "carrier." If the carrier IP packet contains a routable IP, it can be appropriately routed to a specified destination of the carrier IP packet, at which point the payload IP packet can be extracted or "unencapsulated" from the carrier. Such a limitation, non-routable IP addresses, thus creates an access restriction 130 based on design considerations rather than security concerns.

Other design considerations create access restrictions 130 to prevent against unauthorized network traffic from entering or leaving a private network 105. For example, a network firewall may prevent network traffic attempting to enter or leave the private network on the basis of network ports used, protocols used, time of day, originating IP addresses, destination IP addresses, and so forth.

As shown in FIG. 1, a public network 115 has multiple remote clients 145A-145E operating therein. Remote clients 145 operate on public network 115 outside of, or isolated from, private network 110. Remote clients 145 have public IP addresses associated with them and are thus addressable or "routable" from the public network 115. In some embodiments, remote clients 145 may be located behind a network router that is associated with a public IP address and uses a Network Address Translation (NAT) protocol to route information to the remote clients 145. NAT protocol is also referred to as network "masquerading," "Native Address Translation," or IP masquerading. For example, an Internet Service Provider (ISP) may assign one IP address to a home user who can use that IP address to connect one computing device (e.g., remote client 145A) to public network 115. Alternatively, the home user can associate the IP address from the ISP with a NAT compatible router, and connect multiple remote clients 145 to the router, using the router as a translator or intermediary. Remote clients 145 may be, for example, a desktop computer, a personal computer (PC) (e.g., an x86 based PC), mobile phones, palm-sized computing devices, personal digital assistants (PDAs), etc. Remote clients 145 may also provide access to information and services as a type of computer server, as a single computer or can be both a client and a server based on its configuration.

Computer server 105 operating within private network 110 is shown communicably interfaced with remote client 145A operating within public network 115 via secure communication channel 135. In one embodiment, access restrictions 130 prevent remote client 145A from initiating a connection or routing information to computer server 105 from public network 115; however, remote client 145A can receive information and connection requests from computer server 105. In this embodiment, access restrictions 130 do not prevent computer server 105 from initiating a connection with remote client 145A, but do prevent incoming connections to computer server 105 from any computing device operating within public network 115.

Secure communication channel 135 may be established, initiated, or created by computer server 105. Secure communication channel 135 creates a pathway between computer server 105 operating within private network 110 through access restrictions 130, to remote client 145A operating within public network 115. The secure communication channel 135 may be initiated at the computer server 105 via a secure shell (SSH) client application or interface. SSH refers to a protocol that allows the establishment of a communication path between two computing devices and optionally allows for encryption of data transmitted via the communication path.

Using the SSH client interface, computer server 105 can initiate a secure communication channel 135 with any remote client 145 having a routable IP address, for example, any remote client 145 operating within public network 115. For example, in one embodiment, computer server 105 can initiate a secure communication channel 135 with remote client 145A by specifying an IP address for remote client 145A via the SSH client interface. In this embodiment, remote client 145A receives a request for the secure communication channel 135 from computer server 105. The request is routed from computer server 105 over private network 110 and through access restrictions 130 onto public network 115 and to remote client 145A.

An SSH "daemon" or SSH server application operating at remote client 145A may authorize or deny a requested secure communication channel 135, for example, based on authentication credentials such as a username and password. SSH client side and server side functionality refers to the roles a computing device exhibits during the initialization of an SSH session, such as initiating a secure communication channel 135. For example, in one embodiment, computer server 105 provides access and information to other computing devices, such as remote client 145A, and thus acts as a "server" for such purposes. However, for the purposes of initiating a secure communication channel 135 with remote client 145A, the computer server 105 acts as a client. Conversely, remote client 145A, which accesses information and services from computer server 105, and thus performs the role of a typical "client," provides computer server 105 with SSH protocol services, and thus, performs the role of a "server" with respect to authorizing and allowing the establishment of the secure communication channel 135 requested by computer server 105. In other words, computer server 105 acts as a client and remote client 145A acts as a server during the creation of the secure communication channel 135, reversing their otherwise normal roles. Once the secure communication channel 135 is established between computer server 105 and remote client 145A, the two computer nodes act as equal "peers" with respect to communications transmitted over secure communication channel 135.

Secure communication channel 135 is not solicited by remote client 145A, but rather is initiated by computer server 105 and "pushed" through the private network's 110 access restrictions 130 by computer server 105. This is contrary to traditional VPN methodologies under which a remote client operating within a public network initiates communications with a computer server operating within a private network. However, where access restrictions 130 exist, it may not be possible for a remote client within the public network to successfully initiate and establish a connection with a server computer operating within a private network, at least without administrative access to networking equipment and software.

In one embodiment, computer server 105 initiates an SSH request with remote client 145A by specifying a public IP address associated with remote client 145A on public network 115. The SSH protocol operates on network port "22" by default; however, access restrictions 130 may prevent even outgoing communication events from computer server 105 on default SSH protocol port "22." A blocked default port can be circumvented, however, by configuring computer server 105 to issue the SSH request to a non-default port, so long as that port is actively monitored at remote client 145A by an SSH protocol server or daemon for incoming connection attempts or requests.

Network administrators may block ports to prevent certain types of communications with computing devices outside of private network 105. For example, a network administrator may block SSH port "22" to prevent the creation of outbound network tunnels or secure communication channels 135. More aggressive network administrators may block all but a few select ports from both incoming and outgoing communication events. However, if a network port is known to be "open," the SSH client on computer server 105 and the SSH server on remote client 145A can be configured to establish secure communication channel 135 over that port. For example, port "80" is the default port for Hyper Text Transfer Protocol (HTTP) network traffic, or sometimes port "8080" for HTTP traffic over a proxy server. If port "80" or "8080" is left open so that computer server 105 and other computer systems within private network 110 can access web sites on the Internet (e.g., public network 115), then secure communication channel 135 can be established over port 80 by specifying port 80 via the SSH client and by instructing an SSH server at remote client 145A to monitor port 80 or 8080. Moreover, communications may be obfuscated by using, for example, HTTP Secure (HTTPS) port "443" which is normally used for encrypted web traffic. As the web traffic on this port is expected to be encrypted, communications may be less prone to discovery by a network administrator.

Once secure communication channel 135 is established, remote client 145A may transmit information back to computer server 105 over the secure communication channel over a known and established communication path, without having to initiate a connection that traverses access restrictions 130 or having to determine a route to computer server 105 possibly operating at a non-routable IP address. Remote client 145A may further receive instructions from computer server 105. For example, in one embodiment, computer server 105 initiates an SSH command shell with remote client 145A, allowing computer server 105 to issue commands to remote client 145A to be executed at remote client 145A.

For example, in one embodiment, computer server 105 issues instructions 125 to remote client 145A via secure communication channel 135. Instructions 125 dictate that remote client 145A request a Point-to-Point Protocol (PPP) session 140 with computer server 105 via secure communication channel 135 already established between the two computer nodes (e.g., computer server 105 and remote client 145A).

PPP was originally used to manage dial-up connections between a client node (e.g., a home PC lacking internet access) and a server node with network access (e.g., a network server at an "dial-up" ISP), over a traditional land-line based telephone connection. However, PPP may be used for many other purposes, including to establish a VPN connection between a client node without access to a desired network (such as remote client 145A which is not part of private network 110) and a server node that is part of the desired network (such as computer server 105 operating within private network 110). Ordinarily, remote client 145A is unable to initiate a PPP session 140 with computer server 105 because access restrictions 130 (e.g., a non-routable address, firewalls, proxy servers, etc.) prevent incoming connection requests from public network 115. However, remote client 145A can initiate a PPP session 140 with computer server 105 over secure communication channel 135 as the secure communication channel passes through or "traverses" access restrictions 130 providing a return communication path directly to computer server 105.

For example, in one embodiment, remote client 145A receives instructions 125 from computer server 105 directing remote client 145A to initiate a PPP session 140 with computer server 105. Remote client 145A then sends a PPP session request 120 to computer server 105 over secure communication channel 135. When computer server 105 receives the PPP session request 120, it authorizes or grants permission for the PPP session 140 and connects with remote client 145A, thereby allowing remote client 145A access to information and services available via computer server 105 and access to private network 110.

For the request of PPP session 140, remote client 145A acts as a traditional "client," seeking access from a PPP session "server." Similarly, compute server 105 acts as a traditional "server," providing access to remote client 145A via PPP session 140, after authorization or authentication. Remote client 145A may use a PPP session client to make PPP session request 120 and computer server 105 may use a PPP server or PPP daemon for servicing and authorizing PPP session request 120.

Connecting remote client 145A with computer server 105 via a PPP session 140 results in a VPN or a "VPN session." The VPN in this case would be a network consisting of at least computer server 105 and remote client 145A isolated from a larger network, such as public network 115, having at least a portion of the network links traversing a publicly shared network, outside the exclusivity of private network 110 in which computer server 105 operates. Upon connecting remote client 145A to computer server 105 over the VPN (e.g., via the PPP session 140 which is established over the SSH based secure communication channel 135), remote client 145A can access information within private network 110 which is normally inaccessible from computing devices operating outside of the private network. For example, an Enterprise employee could access an email account or email server within the private network, or locally host a desktop session operating at computer server 105 (e.g., a workstation desktop) at remote client 145A.

Figure 2:
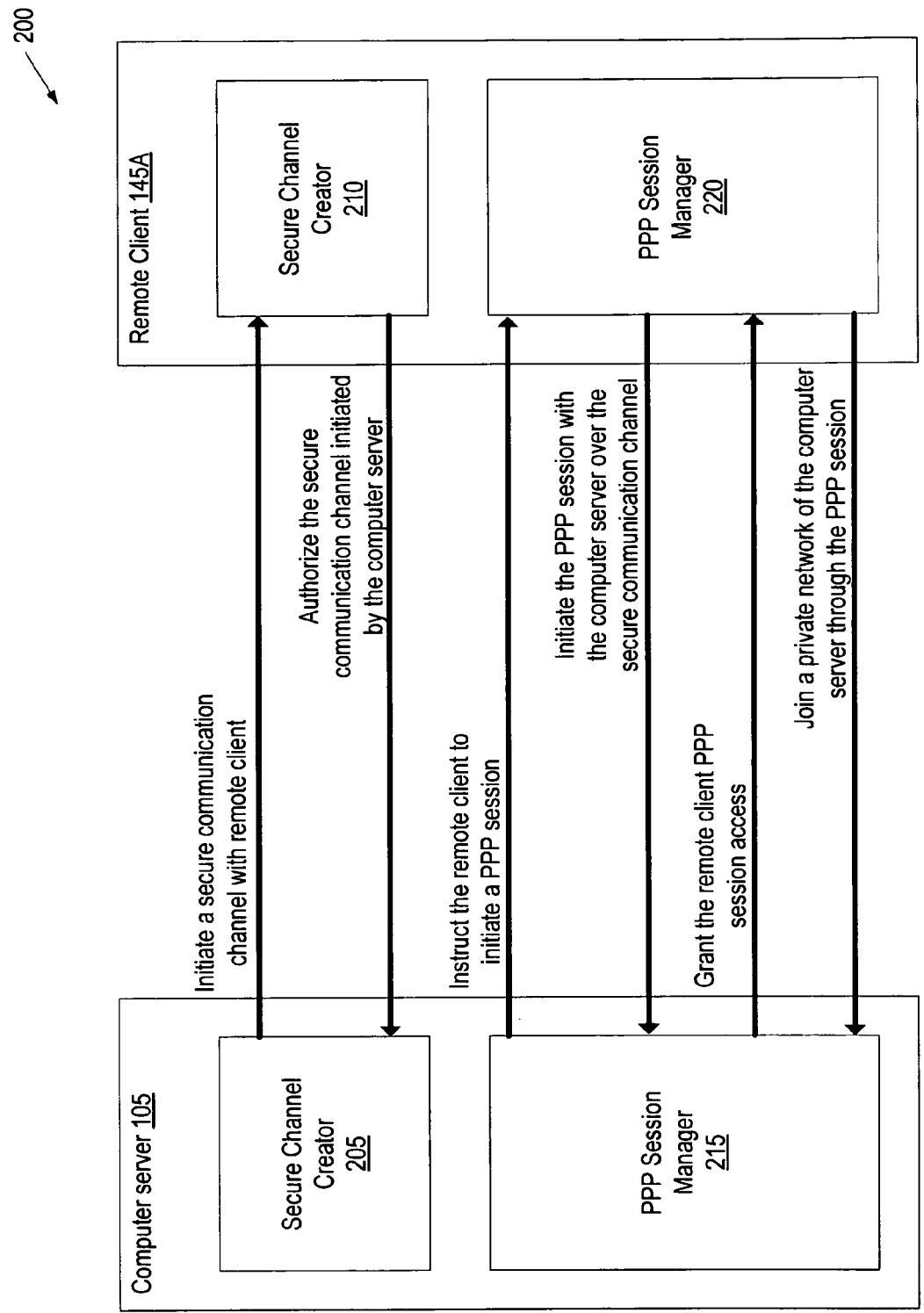
FIG. 2 is a system level flow diagram illustrating a method for enabling a remote client operating on a public network to connect with a computer server operating within a private network, in accordance with one embodiment of the present invention.

FIG. 2 is a block diagram of a system 200 for enabling a remote client 145A operating on a public network to connect with a computer server 105 operating within a private network, in accordance with one embodiment of the present invention. The computer server 105 operates within a private network and remote client 145A operates within a public network, outside the private network, and isolated from the private network by access restrictions that prevent remote client 145A from making unsolicited connection attempts to computer server 105.

The computer server 105 may include a secure channel creator 205 and a PPP session manager 215 that may be implemented in software, hardware, or a combination of the above. The remote client 145A may include a secure channel creator 210 and a PPP session manager 220 that may be implemented in software, hardware, or a combination of the above. Although the above components in the computer server 105 and the remote client 145A have similar names, they perform different operations that correspond to the server and client functionality of system 200 respectively.

Initially, the secure channel creator 205 of the computer server 105 initiates a secure communication channel with remote client 145A. In response, the secure channel creator 210 of the remote client 145A authorizes the secure communication channel initiated by computer server 105. In one embodiment, the secure channel creator 210 authorizes the secure communication channel based on authentication credentials provided by an SSH client at computer server 105. Authentication credentials may include a user name and password, a "trusted" computer's master key, SSH public key authentication, etc.

Next, the PPP session manager 215 of the computer server 105 instructs remote client 145A to initiate a PPP session with computer server 105. In one embodiment, the PPP session manager 215 sends the instructions via an SSH command shell over the secure communication channel.

In response, the PPP session manager 220 of the remote client 145A initiates the PPP session with the computer server over the secure communication channel. In one embodiment, the PPP session is initiated with the computer server by issuing a PPP session request to the computer server 105 via a PPP client.

Further, the PPP session manager 215 of the computer server 105 grants the remote client 145A, the requested PPP session access. In one embodiment, a PPP daemon or a PPP server authenticates the remote client's 145A PPP session request allowing the PPP session to be established. The PPP session manager 220 of the remote client 145A then joins a private network of the computer server 105 through the PPP session. In one embodiment, the PPP session manager 220 of the remote client 145A is enabled to access information and services within the private network of computer server 105 via the PPP session with computer server 105. The establishment of a PPP session with computer server 105 may result in a virtual network interface at remote client 145A, through which remote client can send information to the private network, initiate unsolicited connection requests directed toward the private network, and obtain information and services available within the private network.

Figure 3:
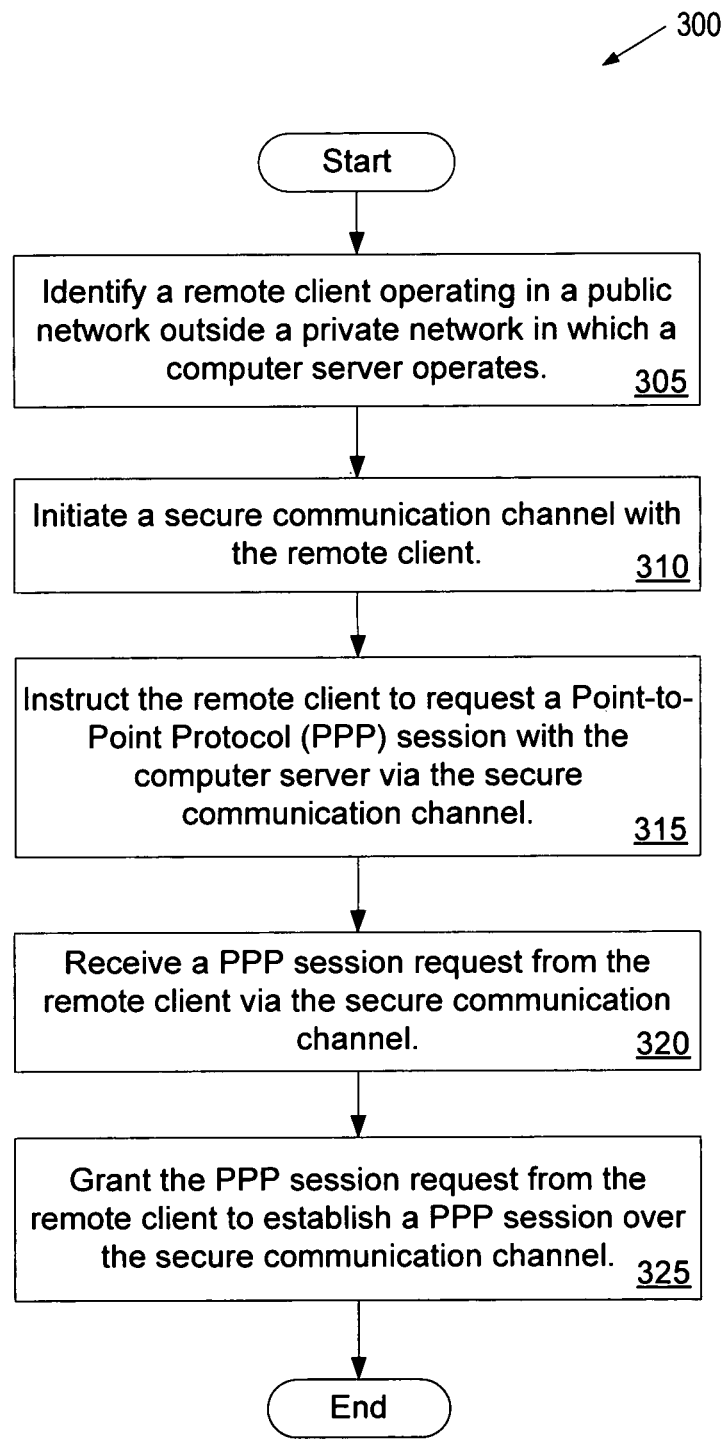
FIG. 3 is a flow diagram illustrating a method for instructing a remote client to initiate a Point-to-Point Protocol session with a computer server over a secure communication channel, in accordance with one embodiment of the present invention.

FIG. 3 is a flow diagram illustrating a server-side method 300 for enabling access to a computer server on a private network by a remote client on a public network, in accordance with one embodiment of the present invention. Method 300 may be performed by processing logic that may include hardware (e.g., circuitry, dedicated logic, programmable logic, microcode, etc.), software (e.g., instructions run on a processing device to perform hardware simulation), or a combination thereof. In one embodiment, method 300 is performed by a computer server, such as computer server 105 of FIG. 1.

Referring to FIG. 3, method 300 begins with processing logic identifying a remote client operating in a public network outside the private network (block 305). The private network is isolated from the public network by access restrictions that prevent incoming connections from the public network.

Identifying the remote client may include identifying the remote client based on user input (e.g., input received via a command shell), based on information stored in a configuration file (e.g., a host name, list of host names, or an IP address, or list of IP addresses stored in a file accessible from the remote client), based on a query to a database, based on an IP address posted to a website (e.g., a webpage posted by the remote client specifying its own IP address for the server to reference), based on a known response to a suspected IP address (e.g., sending remote query via finger or another remote status command to a range of IP addresses thought to contain the remote client and identifying the IP address associated with a predicted response), etc.

At block 310, processing logic initiates a secure communication channel with the remote client. In one embodiment, the secure communication channel is initiated via an SSH compatible client application of the computer server.

At block 315, processing logic instructs the remote client to request Point-to-Point Protocol (PPP) session with the computer server via the secure communication channel. In one embodiment, the instructions from the computer server are directed to a privileged shell executing at the remote client, such as a "super user," "administrative" or "root" shell. The instructions may be provided by a user (e.g., via a command line at the computer server) or the instructions may be issued via an automated script triggered to begin execution automatically based on some event, such as a time event, a boot-up sequence event, or another trigger (e.g., periodically checking for a flag or the presence of a file, etc.).

In one embodiment, the computer server executes a shell script with "root" privileges and activates port forwarding and masquerading on the server. The shell script may further configure the computer server to allow a "root" account of the remote client to log in to a non-privileged user account at the computer server without the use of a password, for example, through the use of a shared public key or other acceptable authentication mechanisms. Issuing commands to configure the computer server and issuing remote commands to the remote client may require privileged access to each machine; however, administrative access to the network hardware is not required so long as an open port is selected.

At block 320, processing logic receives a PPP session request from the remote client via the secure communication channel. At block 325, processing logic grants the PPP session request from the remote client to establish a PPP session over the secure communication channel.

Figure 4:
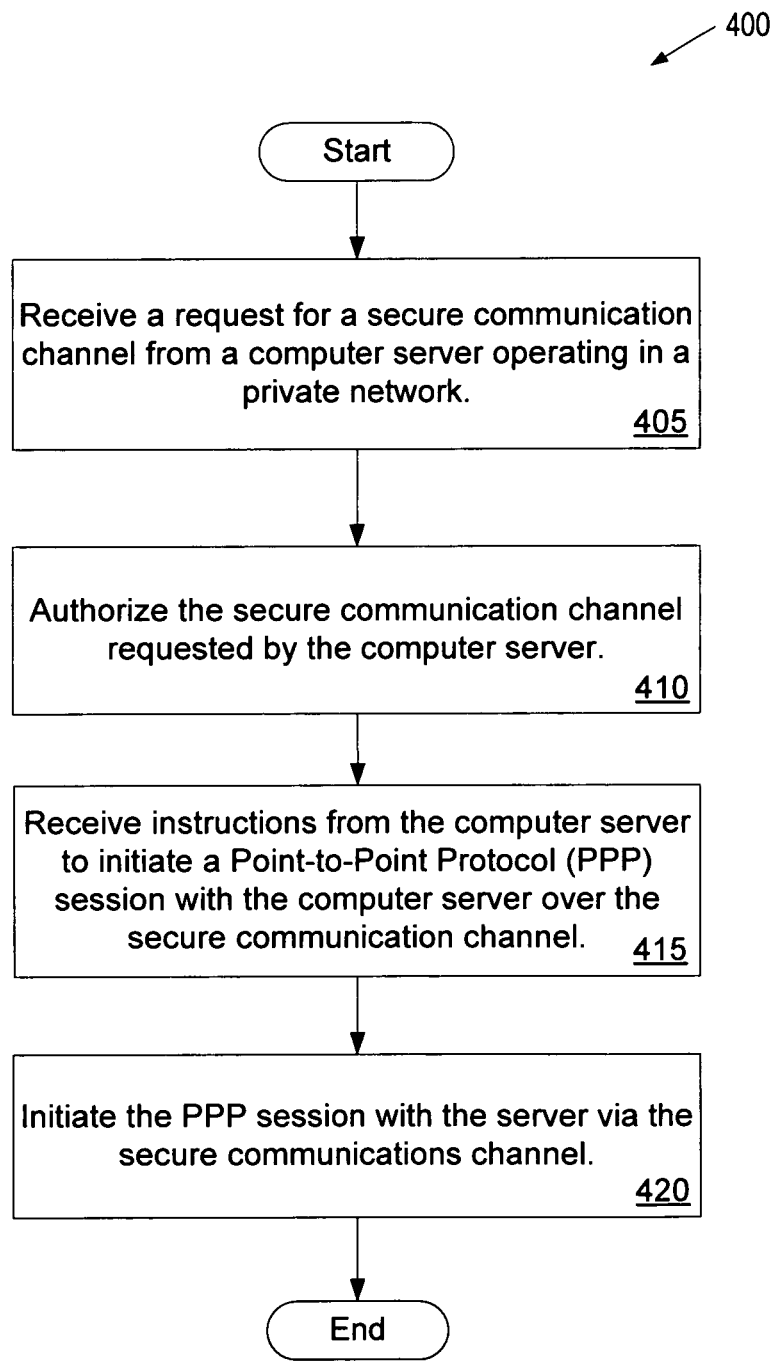
FIG. 4 is a flow diagram illustrating a method for receiving instructions from a computer server to initiate a Point-to-Point Protocol session with a computer server over a secure communication channel, in accordance with one embodiment of the present invention.

FIG. 4 is a flow diagram illustrating a client-side method 400 for enabling access to a computer server on a private network by a remote client on a public network, in accordance with one embodiment of the invention. Method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, method 400 is performed by a computing device, such as remote client 145A of FIG. 1.

Referring to FIG. 4, method 400 begins with processing logic receiving a request for a secure communication channel from a computer server operating in a private network (block 405). The private network is isolated from the public network by access restrictions that prevent unsolicited connections from the public network.

At block 410, processing logic authorizes the secure communication channel requested by the computer server. At block 415, processing logic receives instructions from the computer server to initiate a Point-to-Point Protocol (PPP) session with the computer server over the secure communication channel. At block 420, processing logic initiates the PPP session with the computer server via the secure communication channel.

Figure 5:
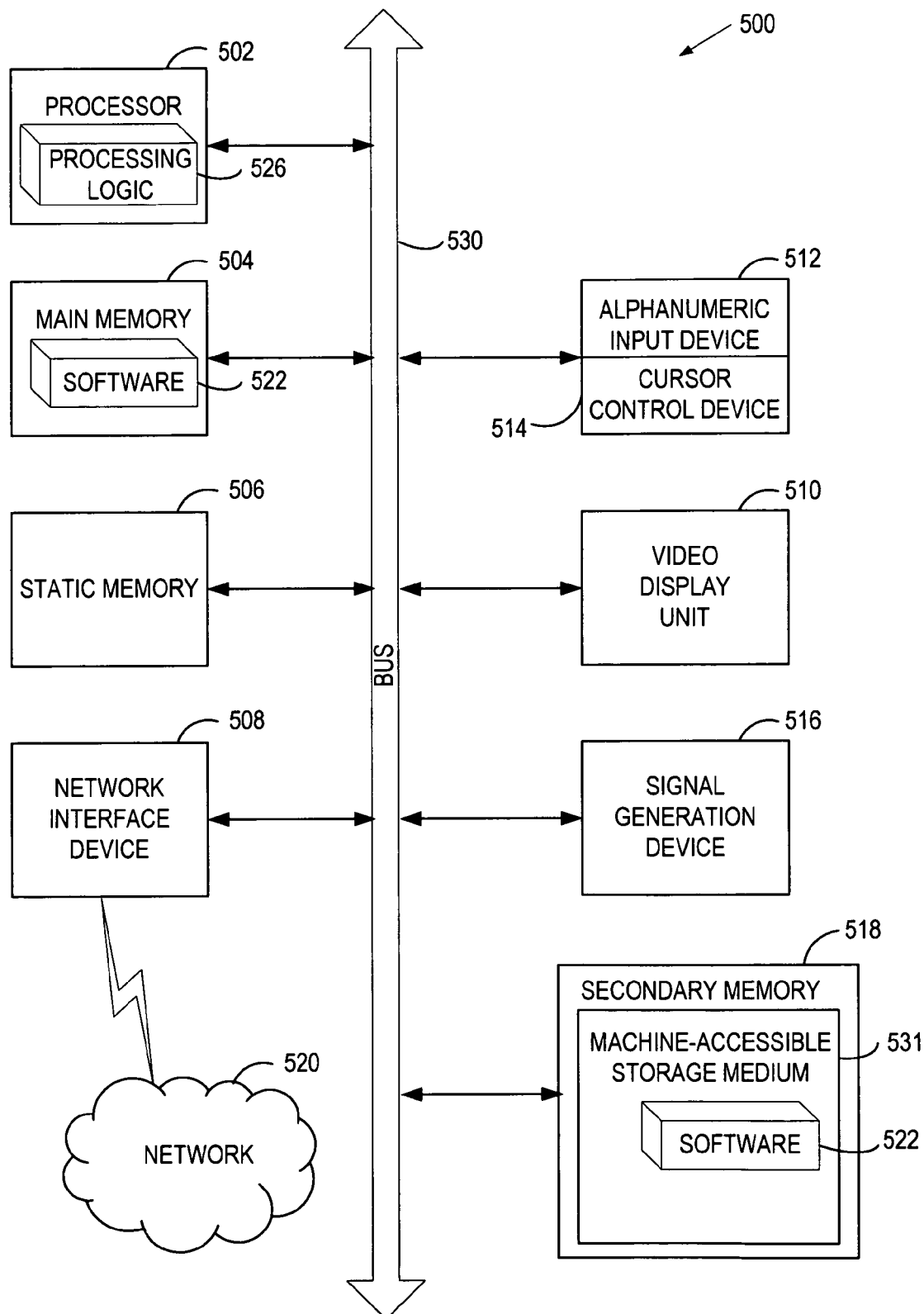
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
   identifying, by a server computer system operating within a private network, a remote client operating in a public network, the private network isolated from the public network by access restrictions preventing incoming connections to the server computer system from the public network;
   initiating, by the server computer system, a secure communication channel with the remote client, the secure communication channel not being solicited by the remote client, the secure communication channel traversing the access restrictions;
   instructing, by the server computer system, the remote client over the secure communication channel to request a Point-to-Point Protocol (PPP) session with the server computer system via the secure communication channel, wherein instructing the remote client over the secure communication channel to request the PPP session with the server computer system comprises:
     causing the remote client to execute a PPP client; and
     causing the PPP client to initiate the PPP session with the server computer system;
   receiving, by the server computer system, a PPP session request for the PPP session from the remote client via the secure communication channel; and
   granting the PPP session request from the remote client to establish the PPP session over the secure communication channel.

2. The computer-implemented method of claim 1, wherein the secure communication channel allows peer to peer communications between the server and the remote client over the secure communication channel.

3. The computer-implemented method of claim 1, wherein the secure communication channel traverses the access restrictions to enable the server computer system to receive incoming connections from the remote client.

4. The computer-implemented method of claim 1, wherein:
   causing the remote client to execute the PPP client comprises initiating a remote command shell with the remote client over the secure communication channel, the remote command shell enabling the server computer system to issue commmands directly to the remote client; and instantiating the PPP client of the remote client via the remote command shell; and
   causing the PPP client to initiate the PPP session with the server computer system comprises instructing the PPP client via the remote command shell to open the PPP session with the server computer system via the secure communication channel.

5. The computer-implemented method of claim 1, wherein:
   causing the remote client to execute the PPP client comprises issuing remote commands to the remote client via the secure communication channel, wherein the remote commands comprise instructing the remote client to execute the PPP client of the remote client, and
   causing the PPP client to initiate the PPP session with the server computer system comprises instructing the remote client to initiate the PPP session with the server computer system via the PPP client.

6. The computer-implemented method of claim 1, wherein the access restrictions comprise the server computer system operating within the private network behind a network router that does not accept incoming connections.

7. The computer-implemented method of claim 6, wherein the server computer system comprises a server Internet Protocol (IP) address that is not addressable from the public network, and wherein the remote client comprises a client IP address that is addressable from both the public network and the private network.

8. The computer-implemented method of claim 6, wherein the network router allows outgoing connections from the private network to the public network and allows incoming network traffic responsive to the outgoing connections.

9. The computer-implemented method of claim 1, wherein the server computer system comprises an employee workstation operating within the private network, and wherein the private network comprises an Enterprise intranet isolated from the public network via the access restrictions.

10. The computer-implemented method of claim 1, wherein the remote client operating in the public network comprises the remote client communicably interfaced to a public Internet network via a Network Address Translation (NAT) protocol compatible router, wherein the NAT protocol compatible router is associated with a publicly addressable Internet Protocol (IP) address and communicably interfaces the remote client with the public Internet network.

11. A computer-implemented method in a remote client computer system operating within a public network, comprising:
   receiving, by the client computer system, a request for a secure communication channel from a server computer system operating in a private network, the private network isolated from the public network by access restrictions that prevent unsolicited connections from the public network, the secure communication channel not being solicited by the client computer system, the secure communication channel traversing the access restrictions;
   authorizing, by the client computer system, the secure communication channel requested by the server computer system;
   receiving, by the client computer system, instructions from the server computer system via the secure communication channel to initiate a Point-to-Point Protocol (PPP) session with the server computer system over the secure communication channel; and
   in response to the instructions received from the server computer system, initiating, by the client computer system, the PPP session with the server computer system via the secure communication channel, wherein initiating the PPP session with the server computer system comprises executing a PPP client, and using the PPP client to initiate the PPP session with the server computer system.

12. The computer-implemented method of claim 11, wherein:
   the server computer system comprises an employee workstation operating within the private network;
   the private network comprises an Enterprise intranet isolated from the public network via the access restrictions; and wherein
   the remote client computer system comprises a Personal Computer (PC) accessible over the public network via a Network Address Translation (NAT) capable router operating on the public network.

13. The computer-implemented method of claim 11, wherein the secure communication channel allows peer to peer communications between the remote client computer system and the server computer system.

14. The computer-implemented method of claim 11, wherein the server computer system comprises a server Internet Protocol (IP) address that is not addressable from the public network, and wherein the remote client computer system comprises a client IP address that is addressable from both the public network and the private network.

15. A non-transitory computer readable storage medium having instructions stored thereon that, when executed by a server computer system, cause the server computer system to perform a method comprising:
    identifying, by the server computer system operating within a private network, a remote client operating in a public network, the private network isolated from the public network by access restrictions preventing incoming connections to the server computer system from the public network;
    initiating, by the server computer system, a secure communication channel with the remote client, the secure communication channel not being solicited by the remote client, the secure communication channel traversing the access restrictions;
    instructing, by the server computer system, the remote client over the secure communication channel to request a Point-to-Point Protocol (PPP) session with the server computer system via the secure communication channel, wherein instructing the remote client over the secure communication channel to request the PPP session with the server computer system comprises:
        causing the remote client to execute a PPP client; and
        causing the PPP client to initiate the PPP session with the server computer system;
    receiving, by the server computer system, a PPP session request for the PPP session from the remote client via the secure communication channel; and
    granting the PPP session request from the remote client to establish the PPP session over the secure communication channel.

16. The non-transitory computer readable storage medium of claim 15, wherein:
    causing the remote client to execute the PPP client comprises initiating a remote command shell with the remote client over the secure communication channel, the remote command shell enabling the server computer system to issue commands directly to the remote client; and instantiating the PPP client of the remote client via the remote command shell; and
    causing the PPP client to initiate the PPP session with the server computer system comprises instructing the PPP client via the remote command shell to open the PPP session with the server computer system via the secure communication channel.

17. The non-transitory computer readable storage medium of claim 15, wherein:
    the server comprises an employee workstation operating within the private network;
    the private network comprises an Enterprise intranet isolated from the public network via the access restrictions, the access restrictions comprising a network router of the private network configured to reject unsolicited incoming connection attempts; and wherein
    the remote client comprises a Personal Computer (PC) accessible over the public network via a Network Address Translation (NAT) capable router operating on the public network.

18. The non-transitory computer readable storage medium of claim 15, wherein the server computer system comprises a server Internet Protocol (IP) address that is not addressable from the public network, and wherein the remote client comprises a client IP address that is addressable from both the public network and the private network.

19. A server computer system, comprising:
    a memory; and
    a processing device, coupled to the memory, wherein the processing device is to cause:
    a secure channel creator operating in the server computer system within a private network to initiate a secure communication channel with a remote client, the remote client to operate in a public network, the secure communication channel not being solicited by the remote client, the private network isolated from the public network by access restrictions preventing incoming connections to the server computer system from the public network, the secure communication channel traversing the access restrictions; and
    a Point-to-Point Protocol (PPP) session manager operating in the server computer system, to:
        instruct the remote client over the secure communication channel to request a PPP session with the server computer system apparatus via the secure communication channel, wherein instructing the remote client over the secure communication channel to request the PPP session comprises causing the remote client to execute a PPP client, and causing the PPP client to initiate the PPP session with the server computer system,
        receive a PPP session request for the PPP session from the remote client via the secure communication channel, and
        grant the PPP session request from the remote client to establish the PPP session over the secure communication channel.

20. The server computer system of claim 19, further comprising:
    a network interface associated with a non-routable Internet Protocol (IP) address; and
    the secure communication channel to establish a return communication pathway within the secure communication channel, the return communication pathway to provide a route to the network interface associated with the non-routable IP address.

21. The server computer system of claim 19, further comprising:
    an employee workstation to operate within the private network comprising an Enterprise intranet isolated from the public network via the access restrictions, the access restrictions comprising a network router of the private network configured to reject unsolicited incoming connection attempts; wherein the remote client comprises a Personal Computer (PC) accessible over the public network via a Network Address Translation (NAT) capable router operating on the public network.

* * * * *